(12) United States Patent
Berko-Boateng

(10) Patent No.: US 9,812,032 B2
(45) Date of Patent: *Nov. 7, 2017

(54) DEVICE AND METHOD FOR TEACHING NUMERAL SYSTEMS

(71) Applicant: Justin Berko-Boateng, London (GB)

(72) Inventor: Justin Berko-Boateng, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/058,058

(22) Filed: Mar. 1, 2016

(65) Prior Publication Data

US 2016/0180740 A1    Jun. 23, 2016

Related U.S. Application Data

(63) Continuation of application No. 13/650,349, filed on Oct. 12, 2012, now Pat. No. 9,275,555.

(51) Int. Cl.
  *G09B 23/02*  (2006.01)
  *G09B 19/02*  (2006.01)
  *G09B 19/22*  (2006.01)

(52) U.S. Cl.
  CPC .............. *G09B 19/02* (2013.01); *G09B 19/22* (2013.01); *G09B 23/02* (2013.01)

(58) Field of Classification Search
  USPC ....... 434/128, 188, 191, 193, 195, 196, 200, 434/203, 204, 205, 208, 209, 211
  See application file for complete search history.

(56) References Cited

U.S. PATENT DOCUMENTS

| | | | | |
|---|---|---|---|---|
| 384,959 | A | * 6/1888 | Carr | G09B 19/02 273/148 R |
| 2,804,699 | A | 9/1957 | Robinson | |
| 3,280,480 | A | * 10/1966 | Rice | G09B 19/02 434/205 |
| 3,360,874 | A | 1/1968 | Myers | |
| 3,908,287 | A | 9/1975 | Darnell | |
| 3,995,378 | A | 12/1976 | Darnell | |
| 4,132,015 | A | * 1/1979 | Machen | G09B 19/02 434/118 |
| 4,176,474 | A | * 12/1979 | O'Sullivan | G09B 19/02 434/210 |
| 4,372,742 | A | * 2/1983 | Wentworth | G09B 19/02 434/199 |
| 4,565,374 | A | 1/1986 | Pak | |
| 4,856,998 | A | * 8/1989 | Silas | G09B 23/02 434/199 |
| 5,176,381 | A | * 1/1993 | Winters | A63F 3/0415 273/146 |
| 5,423,682 | A | 6/1995 | Hildebrandt | |
| 5,738,524 | A | * 4/1998 | Tsao | G09B 19/02 434/191 |
| 6,196,847 | B1 | 3/2001 | Karunamuni | |

(Continued)

*Primary Examiner* — Kurt Fernstrom
(74) *Attorney, Agent, or Firm* — Mannava & Kang, P.C.; Arash Behravesh

(57) ABSTRACT

A device and method of teaching and learning numeral systems comprising at least one game board and a plurality of value block pieces, wherein the game board comprises columns whereby one column is a decimal point column and other columns are each a numeric column to form a numeric grid thereon, and wherein each value block piece identifies the number equivalent value of a numeric symbol derived from the symbol's location on the numeric grid.

8 Claims, 7 Drawing Sheets

| Unit Millions Value | Hundred Thousands Value | Ten Thousands Value | Unit Thousands Value | Hundreds Value | Tens Value | Units Value | Decimal Point | Tenths Value | Hundredths Value | Thousandths Value |
|---|---|---|---|---|---|---|---|---|---|---|
| "0" | "0" | "0" | "0" | "0" | "0" | "0" | | "0" | "0" | "0" |
| "1" | "1" | "1" | "1" | "1" | "1" | "1" | | "1" | "1" | "1" |
| "2" | "2" | "2" | "2" | "2" | "2" | "2" | | "2" | "2" | "2" |
| "3" | "3" | "3" | "3" | "3" | "3" | "3" | | "3" | "3" | "3" |
| "4" | "4" | "4" | "4" | "4" | "4" | "4" | | "4" | "4" | "4" |
| "5" | "5" | "5" | "5" | "5" | "5" | "5" | | "5" | "5" | "5" |
| "6" | "6" | "6" | "6" | "6" | "6" | "6" | | "6" | "6" | "6" |
| "7" | "7" | "7" | "7" | "7" | "7" | "7" | | "7" | "7" | "7" |
| "8" | "8" | "8" | "8" | "8" | "8" | "8" | | "8" | "8" | "8" |
| "9" | "9" | "9" | "9" | "9" | "9" | "9" | | "9" | "9" | "9" |

(56) References Cited

U.S. PATENT DOCUMENTS

| | | | |
|---|---|---|---|
| 6,579,101 B2 * | 6/2003 | Phan | G09B 19/02 434/188 |
| 6,729,883 B1 * | 5/2004 | Raiche | G09B 1/00 434/188 |
| D590,442 S * | 4/2009 | Jones | D19/59 |
| 7,914,287 B2 | 3/2011 | Nguyen | |
| 2002/0072043 A1 | 6/2002 | Possidento | |

* cited by examiner

| Unit Millions Value | Hundred Thousands Value | Ten Thousands Value | Unit Thousands Value | Hundreds Value | Tens Value | Units Value | Decimal Point | Tenths Value | Hundredths Value | Thousandths Value |
|---|---|---|---|---|---|---|---|---|---|---|
| "0" | "0" | "0" | "0" | "0" | "0" | "0" | | "0" | "0" | "0" |
| "1" | "1" | "1" | "1" | "1" | "1" | "1" | | "1" | "1" | "1" |
| "2" | "2" | "2" | "2" | "2" | "2" | "2" | | "2" | "2" | "2" |
| "3" | "3" | "3" | "3" | "3" | "3" | "3" | | "3" | "3" | "3" |
| "4" | "4" | "4" | "4" | "4" | "4" | "4" | | "4" | "4" | "4" |
| "5" | "5" | "5" | "5" | "5" | "5" | "5" | | "5" | "5" | "5" |
| "6" | "6" | "6" | "6" | "6" | "6" | "6" | | "6" | "6" | "6" |
| "7" | "7" | "7" | "7" | "7" | "7" | "7" | | "7" | "7" | "7" |
| "8" | "8" | "8" | "8" | "8" | "8" | "8" | | "8" | "8" | "8" |
| "9" | "9" | "9" | "9" | "9" | "9" | "9" | | "9" | "9" | "9" |

Figure 1

| zero millions | zero hundred thousands | zero ten thousands | zero thousands | zero hundreds | zero tens | zero units | zero tenths | zero hundredths | zero thousandths |
|---|---|---|---|---|---|---|---|---|---|
| "0" | "0" | "0" | "0" | "0" | "0" | "0" | "0" | "0" | "0" |
| 0,000,000 | 000,000 | 00,000 | 0,000 | 000 | 00 | 0 / 1 | 0 / 10 | 0 / 100 | 0 / 1,000 |

| one millions | one hundred thousands | one ten thousands | one thousands | one hundreds | one tens | one units | one tenths | one hundredths | one thousandths |
|---|---|---|---|---|---|---|---|---|---|
| "1" | "1" | "1" | "1" | "1" | "1" | "1" | "1" | "1" | "1" |
| 1,000,000 | 100,000 | 10,000 | 1,000 | 100 | 10 | 1 / 1 | 1 / 10 | 1 / 100 | 1 / 1,000 |

| two millions | two hundred thousands | two ten thousands | two thousands | two hundreds | two tens | two units | two tenths | two hundredths | two thousandths |
|---|---|---|---|---|---|---|---|---|---|
| "2" | "2" | "2" | "2" | "2" | "2" | "2" | "2" | "2" | "2" |
| 2,000,000 | 200,000 | 20,000 | 2,000 | 200 | 20 | 2 / 1 | 2 / 10 | 2 / 100 | 2 / 1,000 |

| three millions | three hundred thousands | three ten thousands | three thousands | three hundreds | three tens | three units | three tenths | three hundredths | three thousandths |
|---|---|---|---|---|---|---|---|---|---|
| "3" | "3" | "3" | "3" | "3" | "3" | "3" | "3" | "3" | "3" |
| 3,000,000 | 300,000 | 30,000 | 3,000 | 300 | 30 | 3 / 1 | 3 / 10 | 3 / 100 | 3 / 1,000 |

| four millions | four hundred thousands | four ten thousands | four thousands | four hundreds | four tens | four units | four tenths | four hundredths | four thousandths |
|---|---|---|---|---|---|---|---|---|---|
| "4" | "4" | "4" | "4" | "4" | "4" | "4" | "4" | "4" | "4" |
| 4,000,000 | 400,000 | 40,000 | 4,000 | 400 | 40 | 4 / 1 | 4 / 10 | 4 / 100 | 4 / 1,000 |

Figure 2

| five millions | five hundred thousands | five ten thousands | five thousands | five hundreds | five tens | five units | five tenths | five hundredths | five thousandths |
|---|---|---|---|---|---|---|---|---|---|
| "5" | "5" | "5" | "5" | "5" | "5" | "5" | "5" | "5" | "5" |
| 5,000,000 | 500,000 | 50,000 | 5,000 | 500 | 50 | 5 / 1 | 5 / 10 | 5 / 100 | 5 / 1,000 |

| six millions | six hundred thousands | six ten thousands | six thousands | six hundreds | six tens | six units | six tenths | six hundredths | six thousandths |
|---|---|---|---|---|---|---|---|---|---|
| "6" | "6" | "6" | "6" | "6" | "6" | "6" | "6" | "6" | "6" |
| 6,000,000 | 600,000 | 60,000 | 6,000 | 600 | 60 | 6 / 1 | 6 / 10 | 6 / 100 | 6 / 1,000 |

| seven millions | seven hundred thousands | seven ten thousands | seven thousands | seven hundreds | seven tens | seven units | seven tenths | seven hundredths | seven thousandths |
|---|---|---|---|---|---|---|---|---|---|
| "7" | "7" | "7" | "7" | "7" | "7" | "7" | "7" | "7" | "7" |
| 7,000,000 | 700,000 | 70,000 | 7,000 | 700 | 70 | 7 / 1 | 7 / 10 | 7 / 100 | 7 / 1,000 |

| eight millions | eight hundred thousands | eight ten thousands | eight thousands | eight hundreds | eight tens | eight units | eight tenths | eight hundredths | eight thousandths |
|---|---|---|---|---|---|---|---|---|---|
| "8" | "8" | "8" | "8" | "8" | "8" | "8" | "8" | "8" | "8" |
| 8,000,000 | 800,000 | 80,000 | 8,000 | 800 | 80 | 8 / 1 | 8 / 10 | 8 / 100 | 8 / 1,000 |

| nine millions | nine hundred thousands | nine ten thousands | nine thousands | nine hundreds | nine tens | nine units | nine tenths | nine hundredths | nine thousandths |
|---|---|---|---|---|---|---|---|---|---|
| "9" | "9" | "9" | "9" | "9" | "9" | "9" | "9" | "9" | "9" |
| 9,000,000 | 900,000 | 90,000 | 9,000 | 900 | 90 | 9 / 1 | 9 / 10 | 9 / 100 | 9 / 1,000 |

Figure 2 Cont'd

| "0" | "0" | "0" | "0" | "0" | "0" | "0" | "0" | "0" | "0" |
|---|---|---|---|---|---|---|---|---|---|
| millions | hundred thousands | ten thousands | unit thousands | hundreds | tens | units | tenths | hundredths | thousandths |
| $0 \times 10^6$ | $0 \times 10^5$ | $0 \times 10^4$ | $0 \times 10^3$ | $0 \times 10^2$ | $0 \times 10^1$ | $0 \times 10^0$ | $0 \times 10^{-1}$ | $0 \times 10^{-2}$ | $0 \times 10^{-3}$ |
| $0 \times 1,000,000$ | $0 \times 100,000$ | $0 \times 10,000$ | $0 \times 1,000$ | $0 \times 100$ | $0 \times 10$ | $0 \times 1$ or $0 \div 1$ | $0 \div 10$ | $0 \div 100$ | $0 \div 1,000$ |
| 0,000,000.0 | 000,000.0 | 00,000.0 | 0,000.0 | 000.0 | 00.0 | 0.0 | 0.0 | 0.00 | 0.000 |
| Blank | Blank | Blank | Blank | Blank | Blank | Blank | Blank | Blank | Blank |

| "1" | "1" | "1" | "1" | "1" | "1" | "1" | "1" | "1" | "1" |
|---|---|---|---|---|---|---|---|---|---|
| millions | hundred thousands | ten thousands | unit thousands | hundreds | tens | units | tenths | hundredths | thousandths |
| $1 \times 10^6$ | $1 \times 10^5$ | $1 \times 10^4$ | $1 \times 10^3$ | $1 \times 10^2$ | $1 \times 10^1$ | $1 \times 10^0$ | $1 \times 10^{-1}$ | $1 \times 10^{-2}$ | $1 \times 10^{-3}$ |
| $1 \times 1,000,000$ | $1 \times 100,000$ | $1 \times 10,000$ | $1 \times 1,000$ | $1 \times 100$ | $1 \times 10$ | $1 \times 1$ or $1 \div 1$ | $1 \div 10$ | $1 \div 100$ | $1 \div 1,000$ |
| 1,000,000.0 | 100,000.0 | 10,000.0 | 1,000.0 | 100.0 | 10.0 | 1.0 | 0.1 | 0.01 | 0.001 |
| Blank | Blank | Blank | Blank | Blank | Blank | Blank | Blank | Blank | Blank |

| "2" | "2" | "2" | "2" | "2" | "2" | "2" | "2" | "2" | "2" |
|---|---|---|---|---|---|---|---|---|---|
| millions | hundred thousands | ten thousands | unit thousands | hundreds | tens | units | tenths | hundredths | thousandths |
| $2 \times 10^6$ | $2 \times 10^5$ | $2 \times 10^4$ | $2 \times 10^3$ | $2 \times 10^2$ | $2 \times 10^1$ | $2 \times 10^0$ | $2 \times 10^{-1}$ | $2 \times 10^{-2}$ | $2 \times 10^{-3}$ |
| $2 \times 1,000,000$ | $2 \times 100,000$ | $2 \times 10,000$ | $2 \times 1,000$ | $2 \times 100$ | $2 \times 10$ | $2 \times 1$ or $2 \div 1$ | $2 \div 10$ | $2 \div 100$ | $2 \div 1,000$ |
| 2,000,000.0 | 200,000.0 | 20,000.0 | 2,000.0 | 200.0 | 20.0 | 2.0 | 0.2 | 0.02 | 0.002 |
| Blank | Blank | Blank | Blank | Blank | Blank | Blank | Blank | Blank | Blank |

Figure 3

| "3" | "3" | "3" | "3" | "3" | "3" | "3" | "3" | "3" | "3" |
|---|---|---|---|---|---|---|---|---|---|
| millions | hundred thousands | ten thousands | unit thousands | hundreds | tens | units | tenths | hundredths | thousandths |
| $3 \times 10^6$ | $3 \times 10^5$ | $3 \times 10^4$ | $3 \times 10^3$ | $3 \times 10^2$ | $3 \times 10^1$ | $3 \times 10^0$ | $3 \times 10^{-1}$ | $3 \times 10^{-2}$ | $3 \times 10^{-3}$ |
| $3 \times 1{,}000{,}000$ | $3 \times 100{,}000$ | $3 \times 10{,}000$ | $3 \times 1{,}000$ | $3 \times 100$ | $3 \times 10$ | $3 \times 1$ or $3 \div 1$ | $3 \div 10$ | $3 \div 100$ | $3 \div 1{,}000$ |
| 3,000,000.0 | 300,000.0 | 30,000.0 | 3,000.0 | 300.0 | 30.0 | 3.0 | 0.3 | 0.03 | 0.003 |
| Blank | Blank | Blank | Blank | Blank | Blank | Blank | Blank | Blank | Blank |

| "4" | "4" | "4" | "4" | "4" | "4" | "4" | "4" | "4" | "4" |
|---|---|---|---|---|---|---|---|---|---|
| millions | hundred thousands | ten thousands | unit thousands | hundreds | tens | units | tenths | hundredths | thousandths |
| $4 \times 10^6$ | $4 \times 10^5$ | $4 \times 10^4$ | $4 \times 10^3$ | $4 \times 10^2$ | $4 \times 10^1$ | $4 \times 10^0$ | $4 \times 10^{-1}$ | $4 \times 10^{-2}$ | $4 \times 10^{-3}$ |
| $4 \times 1{,}000{,}000$ | $4 \times 100{,}000$ | $4 \times 10{,}000$ | $4 \times 1{,}000$ | $4 \times 100$ | $4 \times 10$ | $4 \times 1$ or $4 \div 1$ | $4 \div 10$ | $4 \div 100$ | $4 \div 1{,}000$ |
| 4,000,000.0 | 400,000.0 | 40,000.0 | 4,000.0 | 400.0 | 40.0 | 4.0 | 0.4 | 0.04 | 0.004 |
| Blank | Blank | Blank | Blank | Blank | Blank | Blank | Blank | Blank | Blank |

| "5" | "5" | "5" | "5" | "5" | "5" | "5" | "5" | "5" | "5" |
|---|---|---|---|---|---|---|---|---|---|
| millions | hundred thousands | ten thousands | unit thousands | hundreds | tens | units | tenths | hundredths | thousandths |
| $5 \times 10^6$ | $5 \times 10^5$ | $5 \times 10^4$ | $5 \times 10^3$ | $5 \times 10^2$ | $5 \times 10^1$ | $5 \times 10^0$ | $5 \times 10^{-1}$ | $5 \times 10^{-2}$ | $5 \times 10^{-3}$ |
| $5 \times 1{,}000{,}000$ | $5 \times 100{,}000$ | $5 \times 10{,}000$ | $5 \times 1{,}000$ | $5 \times 100$ | $5 \times 10$ | $5 \times 1$ or $5 \div 1$ | $5 \div 10$ | $5 \div 100$ | $5 \div 1{,}000$ |
| 5,000,000.0 | 500,000.0 | 50,000.0 | 5,000.0 | 500.0 | 50.0 | 5.0 | 0.5 | 0.05 | 0.005 |
| Blank | Blank | Blank | Blank | Blank | Blank | Blank | Blank | Blank | Blank |

Figure 3 Cont'd

| "6" | "6" | "6" | "6" | "6" | "6" | "6" | "6" | "6" | "6" |
|---|---|---|---|---|---|---|---|---|---|
| millions | hundred thousands | ten thousands | unit thousands | hundreds | tens | units | tenths | hundredths | thousandths |
| $6 \times 10^6$ | $6 \times 10^5$ | $6 \times 10^4$ | $6 \times 10^3$ | $6 \times 10^2$ | $6 \times 10^1$ | $6 \times 10^0$ | $6 \times 10^{-1}$ | $6 \times 10^{-2}$ | $6 \times 10^{-3}$ |
| $6 \times 1,000,000$ | $6 \times 100,000$ | $6 \times 10,000$ | $6 \times 1,000$ | $6 \times 100$ | $6 \times 10$ | $6 \times 1$ or $6 \div 1$ | $6 \div 10$ | $6 \div 100$ | $6 \div 1,000$ |
| 6,000,000.0 | 600,000.0 | 60,000.0 | 6,000.0 | 600.0 | 60.0 | 6.0 | 0.6 | 0.06 | 0.006 |
| Blank | Blank | Blank | Blank | Blank | Blank | Blank | Blank | Blank | Blank |

| "7" | "7" | "7" | "7" | "7" | "7" | "7" | "7" | "7" | "7" |
|---|---|---|---|---|---|---|---|---|---|
| millions | hundred thousands | ten thousands | unit thousands | hundreds | tens | units | tenths | hundredths | thousandths |
| $7 \times 10^6$ | $7 \times 10^5$ | $7 \times 10^4$ | $7 \times 10^3$ | $7 \times 10^2$ | $7 \times 10^1$ | $7 \times 10^0$ | $7 \times 10^{-1}$ | $7 \times 10^{-2}$ | $7 \times 10^{-3}$ |
| $7 \times 1,000,000$ | $7 \times 100,000$ | $7 \times 10,000$ | $7 \times 1,000$ | $7 \times 100$ | $7 \times 10$ | $7 \times 1$ or $7 \div 1$ | $7 \div 10$ | $7 \div 100$ | $7 \div 1,000$ |
| 7,000,000.0 | 700,000.0 | 70,000.0 | 7,000.0 | 700.0 | 70.0 | 7.0 | 0.7 | 0.07 | 0.007 |
| Blank | Blank | Blank | Blank | Blank | Blank | Blank | Blank | Blank | Blank |

Figure 3 Cont'd

| "8" | "8" | "8" | "8" | "8" | "8" | "8" | "8" | "8" | "8" |
|---|---|---|---|---|---|---|---|---|---|
| millions | hundred thousands | ten thousands | unit thousands | hundreds | tens | units | tenths | hundredths | thousandths |
| $8 \times 10^6$ | $8 \times 10^5$ | $8 \times 10^4$ | $8 \times 10^3$ | $8 \times 10^2$ | $8 \times 10^1$ | $8 \times 10^0$ | $8 \times 10^{-1}$ | $8 \times 10^{-2}$ | $8 \times 10^{-3}$ |
| $8 \times 1,000,000$ | $8 \times 100,000$ | $8 \times 10,000$ | $8 \times 1,000$ | $8 \times 100$ | $8 \times 10$ | $8 \times 1$ or $8 \div 1$ | $8 \div 10$ | $8 \div 100$ | $8 \div 1,000$ |
| 8,000,000.0 | 800,000.0 | 80,000.0 | 8,000.0 | 800.0 | 80.0 | 8.0 | 0.8 | 0.08 | 0.008 |
| Blank | Blank | Blank | Blank | Blank | Blank | Blank | Blank | Blank | Blank |

| "9" | "9" | "9" | "9" | "9" | "9" | "9" | "9" | "9" | "9" |
|---|---|---|---|---|---|---|---|---|---|
| millions | hundred thousands | ten thousands | unit thousands | hundreds | tens | units | tenths | hundredths | thousandths |
| $9 \times 10^6$ | $9 \times 10^5$ | $9 \times 10^4$ | $9 \times 10^3$ | $9 \times 10^2$ | $9 \times 10^1$ | $9 \times 10^0$ | $9 \times 10^{-1}$ | $9 \times 10^{-2}$ | $9 \times 10^{-3}$ |
| $9 \times 1,000,000$ | $9 \times 100,000$ | $9 \times 10,000$ | $9 \times 1,000$ | $9 \times 100$ | $9 \times 10$ | $9 \times 1$ or $9 \div 1$ | $9 \div 10$ | $9 \div 100$ | $9 \div 1,000$ |
| 9,000,000.0 | 900,000.0 | 90,000.0 | 9,000.0 | 900.0 | 90.0 | 9.0 | 0.9 | 0.09 | 0.009 |
| Blank | Blank | Blank | Blank | Blank | Blank | Blank | Blank | Blank | Blank |

Figure 3 Cont'd

DEVICE AND METHOD FOR TEACHING NUMERAL SYSTEMS

FIELD OF THE INVENTION

The present invention relates to a device and method comprising a game board with accompanying game pieces for use in learning and teaching numeral systems.

BACKGROUND OF THE INVENTION

There are available a wide variety of devices having numbers imprinted upon their surfaces for the purpose of teaching young learners place value, rounding, and naming numbers. Despite the availability of those devices, there still is a need, particularly for young learners to learn numeral systems, have an intuitive feel for the denary numeric symbols, understand formation and partitioning of whole numbers and decimal numbers, determine rank order of numbers and understand how to differentiate between numeric symbols and numbers which can be formed from those symbols.

SUMMARY OF THE INVENTION

Accordingly, it is one object of the present invention to provide a device and method for teaching and learning numeral systems with emphasis on the most commonly used denary (base 10) numeral system.

It is another object of the present invention to provide a device and method for teaching and learning the numeric symbols "0", "1", "2", "3", "4", "5", "6", "7", "8" and "9" which are used for the denary numeral system and other numeral systems that have different base indices.

It is yet another object of the present invention to provide a device and method for teaching and learning the formation and partitioning of whole numbers and decimal numbers.

It is yet another object of the present invention to provide a device and method for teaching and learning how to determine the rank order of two or more numbers.

It is yet another object of the present invention to provide a device and method for teaching and learning how to differentiate between numeric symbols and numbers which can be formed by those symbols.

These and other objects of the invention are achieved by providing a device and method that teaches the "countable value" of each numeric symbol as it appears in a sequence of combined numeric symbols, inclusive of a decimal point, thereby teaching and learning counting and synthesis of disparate and unobvious aspects of the numeral systems.

When used for sequential counting, this invention aids users to visualize number in geometric units as "linear distance from zero" (e.g. the number nine is visually the linear distance between zero-and-nine). There is equal spacing between consecutive linear distances (1, 2, 3 etc). As an illustration of addition and multiplication, the distance between zero-and-three added to another distance between zero-and-three is equivalent to the distance between zero-and-six (3+3=6 or 3×2=6). Extending this illustration to subtraction, a comparison of zero-and-three vs zero-and-four is visually the linear distance between three-and-four (4-3 or 3-4), which by visual comparison is the linear distance between zero-and-one (+1) or one-and-zero (−1) depending on orientation.

One object of the present invention provides a device and method for teaching and learning numeral systems by teaching that the comparisons of two or more linear distances form the basis of positive numbers, negative numbers, addition, subtraction and multiplication by whole numbers. In one embodiment, the invention provides a method and device for teaching and learning addition and multiplication. In another embodiment, the invention provides a method and device for teaching and learning subtraction.

As a game, this invention can be played in different game versions.

It is another object of the invention to provide a device and method for increasing the pace with which a person can develop their understanding of the denary numeral system.

It is another object of the invention to provide a device and method which deepens its users' recognition of different written formats to express number, including common language words used to describe number.

Yet another object of the present invention is to provide a device and method for teaching and learning numeral systems which teaches that a whole number or decimal number is a collation of denary numeric symbols, each distinct numeric symbol in the collation having a unique number value. For clarity purposes, the number 13002.35 has seven distinct number values.

In a preferred embodiment, the device and method of the present invention teaches that, for any given whole number or decimal number, one and only one numeric symbol can represent its place value. For clarity purposes, each of the seven distinct numeric symbols in the number 13002.35 has a unique place value.

In another preferred embodiment, the device and method of the present invention teaches that the actual formation of numbers is "mechanically counted" from right to left. A device can be constructed and mounted onto the game board to illustrate the counting mechanism as orderly, chronological shifts of the numeric symbols as evidenced by the numeric grid.

Over time, users of the invention will progress towards an ever increasing spatial understanding of the "geometry of number" and its interface with arithmetic.

BRIEF DESCRIPTION OF THE DRAWINGS

FIG. 1 is an illustration of a denary numeral system game board according to one embodiment of the invention.

FIG. 2 is a one dimensional illustration of one hundred pieces of three sided value blocks that coincide with the denary numeral system.

FIG. 3 is a one dimensional illustration of one hundred pieces of six sided cuboid value blocks that coincide with the denary numeral.

DETAILED DESCRIPTION OF PREFERRED EMBODIMENTS

The device of the present invention comprises at least one game board and a plurality of value block pieces, wherein the game board comprises columns whereby one column is a decimal point column and the other columns are each a numeric column to form a numeric grid thereon, and wherein each value block identifies the number equivalent value of a numeric symbol derived from the symbol's location on the numeric grid.

In a most preferred embodiment, illustrated in FIG. 1, there are seven numeric columns to the left of the decimal point column on the game board and three numeric columns to the right of the decimal point column. Each numeric column has ten rows, the first row of which has insignia "0" representing the numeric symbol 0; the second row "1"; the third row "2"; the fourth row "3"; the fifth row "4"; the sixth row "5"; the seventh row "6"; the eighth row "7"; the ninth row "8"; and the tenth row "9". A preferred game board is in no way constrained as to the number of columns to the right of the decimal point or to the left of the decimal point. Similarly, the game board may also consist of numeric symbols written in the negative (i.e. "−1", "−2", "−3", "−4", "−5", "−6", "−7", "−8" and "−9") which could help to distinguish negative numbers from positive numbers. Likewise, the game board is not restricted to the number of rows bearing in mind, for example, that the number of rows is proportionally related to the base index that is being represented by the game board. A feature of a preferred game board is that it has equal spacing between the numeric symbols to draw particular attention to the spatial and geometric dimensions of number.

The description label for each numeric column is the place value position relative to the decimal point column and is written on the numeric grid above the insignia for the numeric symbols. In a preferred embodiment of the game board, the description labels for the ten numeric columns are from left to right: "unit millions place"; "hundred thousands place"; "ten thousands place"; "unit thousands place"; "hundreds place"; "tens place"; "units place"; "tenths place"; "hundredths place"; and "thousandths place". In cases where the game board is adapted for a numeral system other than the denary numeral system, alternative description labels should be applied, the details of which depend on the numeral system being employed.

The standard number label for each numeric column is also the place value position relative to the decimal point column and is written on the numeric grid above or below the insignia for the description labels. In a preferred embodiment of the game board, the standard labels for the ten numeric columns are from left to right: "$10^6$ place"; "$10^5$ place"; "$10^4$ place"; "$10^3$ place"; "$10^2$ place"; "$10^1$ place"; "$10^0$ place"; "$10^{-1}$ place"; "$10^{-2}$ place"; and "$10^{-3}$ place". For clarity, $10^6$ represents the value 1000000 and likewise $10^{-2}$ represents the fraction ($1/10^2$) or ($1/100$). In cases where the game board is adapted for a numeral system other than the denary numeral system, alternative standard number labels should be applied, the details of which depend on the numeral system being considered. As an example, if the game board is used for Base 8, the "$10^6$ place" would be replaced by the "$8^6$ place". As another example, if the game board is used for Base 5, the "$10^{-3}$ place" would be replaced by the "$5^{-3}$ place". Thus, the value block pieces that accompany a game board depend on the Base numeral system being used by the game board.

The game board can be extended to other base systems. In one embodiment, the numeric grid could be truncated (or extended) to include only those numeric symbols that are relevant for other numeral systems. As an example, Base 3 would only use "0", "1" and "2". Base 4 would only use "0", "1", "2", and "3". Base 6 would only use "0", "1", "2", "4" and "5". These examples are chosen to illustrate that the invention could be used to teach the counting mechanism of the 24 hour clock. Both 60 seconds and 60 minutes use Base 6 and Base 10 simultaneously. 24 hours uses Base 3 and Base 4 simultaneously. Witness all of Base 3, Base 4, Base 6 and Base 10 at same time at 23:59.59 (i.e. just one second before midnight). To extend to numeral systems higher than Base 10, it may be advantageous to use alpha symbols in addition to the most commonly recognised denary numeric symbols so that the teaching and learning derived from the device is not complicated or become convoluted.

The number of value block pieces that are used for a game board depends on the Base numeral systems used in the game board. In a preferred embodiment of the game board, there are one hundred value block pieces in number to accompany it considering that each column is Base 10 and there are 10 columns being employed. In the case of the 24 hour clock example, optimally there are 39 value block pieces (10 value blocks each for the two Base 10 columns, 6 value blocks each for the two Base 6 columns, 4 value blocks for the one Base 4 column and 3 value blocks for the one Base 3 column).

In one embodiment, the value blocks are three-sided pieces as shown in FIG. 2.

Each value block piece identifies the number equivalent value of a numeric symbol derived from the symbol's location on the numeric grid. In a preferred embodiment, the value block piece is a cuboid having a first side, second side, third side, fourth side, fifth side and sixth side. As shown in FIG. 3, the first side of each cuboid value block has insignia "0", "1", "2", "3", "4", "5", "6", "7", "8" or "9". For each cuboid value block, the second side is opposite the first side and is either left blank for game purposes or printed thereon another insignia to draw collective appeal (or individual appeal as the case may be) to the value block pieces. The third side of each value block has written in number language words the place position (i.e. numeric column) of the numeric symbol. The fourth side which is opposite to the third side of each value block is the value of the numeric symbol written as a decimal number. The fifth side of each value block is the value of the numeric symbol written in standard form. The sixth side of each value block is the value of the numeric symbol written as the numeric symbol multiplied by (or divided by in the case decimals) the ordinary number expansion of the standard form label.

In a preferred embodiment, users of the invention are to recognize that the first side (i.e. the numeric symbol in itself) of every value block does not have numerical value. Further, users of the invention are to recognize that it is the third side (i.e. the place position) of every cuboid value block that gives number substance to the numeric symbol. Moreover, the value blocks in a preferred embodiment are designed to enable its users to draw connections between the fourth, fifth and sixth sides and to recognise that these three sides are different numerical expressions of the same number and as such have equivalent value.

The entire device may be constructed of wood, for an improved appearance, or it may even be economically constructed from hard plastic or other polymer. It may even be constructed entirely from cardboard and paper composite products for a very inexpensive version of the device.

A wide variety of colors may be used to represent the numbers and other insignia on the device, as well as the background for the numbers and other insignia, as long as there is sufficient disparity in coloration between the background and the numbers and other insignia printed thereupon.

The game element of the entire device can be played in different versions. One version teaches how to bridge early stage counting with place value by activating systematic, mechanical movements of the numeric symbols. In this version, the referee instructs the contestant to collect each value block and turn it so that its top face shows only the number words (i.e. the third side of every value block). The referee asks the contestant to use the words to identify all of the value blocks that belong on the right of the decimal point column. Once the referee confirms that the contestant has chosen the correct value blocks, he or she takes those value blocks and puts them aside.

Then, the referee informs the contestant that the remaining value blocks represent whole numbers at which point the contestant is asked to explain what a whole number is to the best of his or her ability. The referee instructs the contestant to group the whole number value blocks according to their number words. Once the referee confirms that the contestant has placed each value block in its correct group, the referee instructs the contestant to "order"! Looking only at the words, the contestant forms a straight line for each group of value blocks.

The referee instructs the contestant to "line". The contestant must identify the correct numeric column for each group of value blocks. One group at a time, the contestant positions the straight line of value blocks on the numeric grid in its rightful numeric column before turning over each value block so that its top face is showing a numeric symbol. The straight line is then re-arranged in ascending order from "0" to "9".

The referee instructs the contestant to "ladder". All value blocks are turned over so that their top faces are blank. The contestant says zero. The referee checks that the right-most numeric symbol "0" is shown. All other value blocks are blank. The contestant says one and the referee checks that the right-most numeric symbol "1" is shown with all other value blocks blank, . . . , the contestant says thirteen and only the right-most numeric symbols "1" "3" are shown adjoined together as 13, etc.

A second version of the game can be played by two or more people. Each player will take a turn being a contestant and a referee. The player with the highest points total wins the game.

In this version, each contestant starts with a score of five points. The referee instructs the contestant to initiate round 1 of the game by collecting all ten value blocks from the "thousandths" numeric column. The contestant closes his or her eyes and throws the ten value blocks unto the floor. The referee places on the numeric grid, blank face up in their rightful places, those value blocks whose top face is neither a blank nor a number word. The other value blocks are handed to the contestant to throw again. This process is repeated until only one value block (i.e. "secret count") remains and revealed for the contestant to place on the numeric grid. The referee writes down the contestant's secret count for the round.

Rounds 2 through 10 are played in the same manner as round 1, each successive round being played one numeric column to the left of the previous round. When all ten rounds are finished, the contestant's secret counts are written down and the players rotate turns. The scores are tallied when all contestants have played rounds 1-10. Points are awarded for the highest number in each round. The number created in a round takes into account the results from previous rounds! One point is awarded to the contestant with the highest number in each round representing the "thousandths", "hundredths" and "tenths". Three points are awarded to the contestant with the highest number in each round representing the "units", "tens" and "hundreds". Four points are awarded to the contestant with the highest number in each round representing the "unit thousands", "ten thousands" and "hundred thousands". Six points are awarded to the contestant with the highest number after round 10 representing "unit millions".

A third version of the game can also be played by two or more people. The players will alternate turns being a contestant and a referee. This version is geared towards those who are developing their basic number skills. This version does not require score keeping so players are free to choose their own scoring system.

In this version, the contestant places all of the value blocks on the floor with their top face showing the denary numeric symbol. The referee randomly thinks of a number and either calls it aloud, writes it down in words or both. Without regard to the unique values of the value block pieces, the contestant finds the numeric symbols that represent the referee's number and places them on the numeric grid (where the description labels are). The referee and contestant will then deliberate on their efforts. The referee may request an independent player to challenge the contestant on the accuracy of the assembled number. Similarly, the contestant may request an independent player to challenge the referee on the accuracy of the spoken or written number. Once the results have been validated and agreed by all parties, the players rotate the referee and contestant. Over time, both players should increase their knowledge of number by periodically questioning whether the selection of denary numeric symbols used by the contestant would change if the game takes the unique values of the value block pieces into consideration.

Yet a fourth version of this game can be played by two or more people. Each player will take a turn being a contestant and a referee. The contestant with the lowest points total wins the game.

In this version, each contestant starts with a score of ten. The referee instructs the contestant to throw all value blocks on the floor. One point is added to the contestant's score for every value block whose top face is blank. Only the value blocks whose top face is not blank will be placed on the numeric grid. The referee starts the clock to record the amount of time it takes the contestant to unscramble the value blocks and place them in their rightful position on the numeric grid. The contestant signals to the referee to stop the clock when he or she thinks the value blocks have been assembled correctly. If the contestant is wrong, he or she is cautioned and five penalty points are added. The referee will continue timing the contestant until all of the value blocks are assembled onto their rightful positions on the numeric grid. The contestant's finishing time and points score are recorded. When all players have been a contestant, the player with the fastest time trial gets ten bonus points deducted from his or her score. If more than one player has the lowest final score, that contestant with the fewest penalty points is declared the winner. If there is no clear winner after considering the penalty points, that contestant with the most value blocks on the numeric grid is declared the winner. In the event that there still remains a tie after considering the number of value blocks on the numeric grid, the contestant with the ten bonus points is declared the winner.

There is a plurality of games that can be played with the device, including but not limited to manual games, computer games, games over the internet and games using mobile telephony. The game board can be easily designed and adapted using computer programming and made suitable for software application on various operating system platforms. Game versions that have chance elements associated with the value block pieces can be simulated with random generators or probability based algorithms. Notwithstanding, there are countless iterations of the device and games played using the device that can be created and recreated for teaching and learning of numeric symbols and numeral systems.

What is claimed:

1. A device for teaching and learning numeral systems comprising at least one game board and a plurality of value block pieces, wherein the game board comprises at least two columns whereby one column is a decimal point column and other column is a numeric column having numeric symbols thereon and to form a numeric grid, and wherein each value block piece identifies a number equivalent value of the numeric symbol derived from the symbol's location on the numeric grid.

2. The device of claim 1, wherein the numeric grid comprises at least seven numeric columns to the left of the decimal point column and at least three numeric columns to the right of the decimal point column, and wherein each numeric column has at least ten rows, the first row of which has insignia "0" representing the numeric symbol 0; the second row "1"; the third row "2"; the fourth row "3"; the fifth row "4"; the sixth row "5"; the seventh row "6"; the eighth row "7"; the ninth row "8"; and the tenth row "9" and wherein there is equal spacing between the numeric symbols.

3. The device of claim 2, wherein each numeric column includes a description label that is the place value position relative to the decimal point column and is written on the numeric grid just above the insignia for the denary numeric symbols and the description labels for the ten numeric columns are from left to right: "unit millions place"; "hundred thousands place"; "ten thousands place"; "unit thousands place"; "hundreds place"; "tens place"; "units place"; "tenths place"; "hundredths place"; and "thousandths place".

4. The device of claim 2, wherein each numeric column includes a description label that is the place value position relative to the decimal point column and is written on the numeric grid just above the insignia for the denary numeric symbols and in standard form for the ten numeric columns are from left to right: "$10^6$ place"; "$10^5$ place"; "$10^4$ place"; "$10^3$ place"; "$10^2$ place"; "$10^1$ place"; "$10^0$ place"; "$10^{-1}$ place"; "$10^{-2}$ place"; and "$10^{-3}$ place".

5. The device of claim 1, wherein the numeric grid comprises negative numeric symbols to delineate negative numbers.

6. The device of claim 1, wherein each of the value block pieces is a cuboid having a first side, second side, third side, fourth side, fifth side and sixth side.

7. The device of claim 6, wherein the first side of each cuboid value block has insignia "0", "1", "2", "3", "4", "5", "6", "7", "8" or "9", and wherein, the second side is opposite the first side and is left blank and wherein the third side of each value block has written in number language words the place position of the numeric symbol and wherein the fourth side which is opposite to the third side of each value block is the value of the numeric symbol written as a decimal number and wherein the fifth side of each value block is the value of the numeric symbol written in standard form and wherein the sixth side of each value block is the value of the numeric symbol written as the numeric symbol that is one of multiplied by and divided by the ordinary number expansion of the standard form.

8. The device of claim 1, wherein the value block is a three sided solid figure.

* * * * *